(12) United States Patent
Sayac et al.

(10) Patent No.: US 8,923,576 B2
(45) Date of Patent: Dec. 30, 2014

(54) METHOD FOR DETECTING A FAKE FINGER FOR FINGERPRINT ACQUISITION SOFTWARE

(71) Applicant: Thales, Neuilly-sur-Seine (FR)

(72) Inventors: Charles Sayac, Triel sur Seine (FR); Valerie Letournel, Issy les Moulineaux (FR); Philippe Robin, Bourge la Reine (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/667,898

(22) Filed: Nov. 2, 2012

(65) Prior Publication Data

US 2013/0058544 A1 Mar. 7, 2013

Related U.S. Application Data

(63) Continuation of application No. 13/497,525, filed as application No. PCT/EP2010/062937 on Sep. 3, 2010, now abandoned.

(30) Foreign Application Priority Data

Sep. 22, 2009 (FR) ..................... 09 04515

(51) Int. Cl.
   - *G06K 9/00* (2006.01)
   - *B42D 15/00* (2006.01)

(52) U.S. Cl.
   - CPC ................................. *G06K 9/00114* (2013.01)
   - USPC ........................................... 382/124; 283/68

(58) Field of Classification Search
   - CPC ...................................................... G06K 9/00
   - USPC ......... 382/103, 115, 116, 117, 118, 124, 126; 340/5.52, 5.53, 5.82, 5.93; 283/68, 78; 902/3; 713/186
   - See application file for complete search history.

(56) References Cited

U.S. PATENT DOCUMENTS

| | | | | |
|---|---|---|---|---|
| 5,836,872 | A * | 11/1998 | Kenet et al. | 600/306 |
| 8,229,178 | B2 * | 7/2012 | Zhang et al. | 382/115 |
| 2007/0014443 | A1 * | 1/2007 | Russo | 382/124 |
| 2008/0037001 | A1 * | 2/2008 | Yokoyama et al. | 356/51 |
| 2010/0266168 | A1 * | 10/2010 | Wang et al. | 382/124 |

FOREIGN PATENT DOCUMENTS

WO 2008/108871 A2 9/2008

OTHER PUBLICATIONS

F. Albregtsen: "Statistical Texture Measures Computed from Gray Level Run Length Matrices," Image Processing Laboratory, Department of Informatics, University of Oslo, Nov. 14, 1995.
S. Bhausaheb et al.: "Wavelet Signature and GLCM Features-Based Fingerprint Anti-Spoofing," Wavelet Analysis and Pattern Recognition 2008. ICWAPR '08. International Conference On, IEEE, Piscataway, NJ, USA, Aug. 30, 2008, pp. 717-723.
Arun A. Ross et al.: "Handbook of Multibiometrics," Jan. 1, 2006, Springer, pp. 52, 53 and 56.

(Continued)

*Primary Examiner* — Abolfazl Tabatabai
(74) *Attorney, Agent, or Firm* — Baker & Hostetler LLP

(57) ABSTRACT

A method for detecting a fake finger for fingerprint acquisition software with improved performance, the method implementing a static analysis step including a calculation of a Gray Level Run Length matrix of an image of a finger. Optionally, but preferably, the static analysis and a dynamic analysis are combined so as to optimize the ability to detect fake fingers.

21 Claims, 1 Drawing Sheet

(56) References Cited

OTHER PUBLICATIONS

Xianghua Xie and Majid Mirmehdi: "Handbook of Texture Analysis," Jan. 1, 2009, Imperial College, pp. 375-406.
Nicu Sebe and Michael S. Lew: "Principles of Visual Information Retrieval," Jan. 1, 2001, Springer, pp. 51-86.
S. Li: "Encyclopedia of Biometrics," Jan. 1, 2009, Springer, pp. 135-140, 191-197, 900, and 924-931.
D. Maltoni et al.: "Handbook of Fingerprint Recognition (2nd Edition)," Jan. 1, 2009, Springer, pp. 371-416.
C. Dorai et al.: Automatic Fingerprint Recognition Systems, Jan. 1, 2004, p. 70.
R. Derakhshani et al.: "Determination of vitality from a non-invasive biomedical measurement for use in fingerprint scanners," Pattern Recognition, vol. 36, No. 2, Feb. 1, 2003, pp. 383-396.
S. B. Nikam et al.: "Fingerprint Anti-Spoofing Using Ridgelet Transform," Biometrics: Theory, Applications and Systems, 2008. BTAS 2008. 2nd IEEE International Conference On, Sep. 29, 2008, pp. 1-6, IEEE, Piscataway, NJ, USA.
S. B. Nikam et al.: "Local binary pattern and wavelet-based spoof fingerprint detection," International Journal of Biometrics, vol. 1, No. 2, Jan. 1, 2008, pp. 141-159, Inderscience Publishers, GB.
S. B. Nikam et al.: "Wavelet-based multiresolution analysis of ridges for fingerprint liveness detection," International Journal of Information and Computer Security, vol. 3, No. 1, Jan. 1, 2009, pp. 1-46, Inderscience Publishers, UK, pp. 1744-1765.
S. B. Nikam et al.: "Gabor Filter-Based Fingerprint Anti-Spoofing," Oct. 20, 2008, Advanced Concepts for Intelligent Vision Systems; [Lecture Notes in Computer Science], Springer Berlin Heidelberg, Berlin, Heidelberg, pp. 1103-1114.

\* cited by examiner

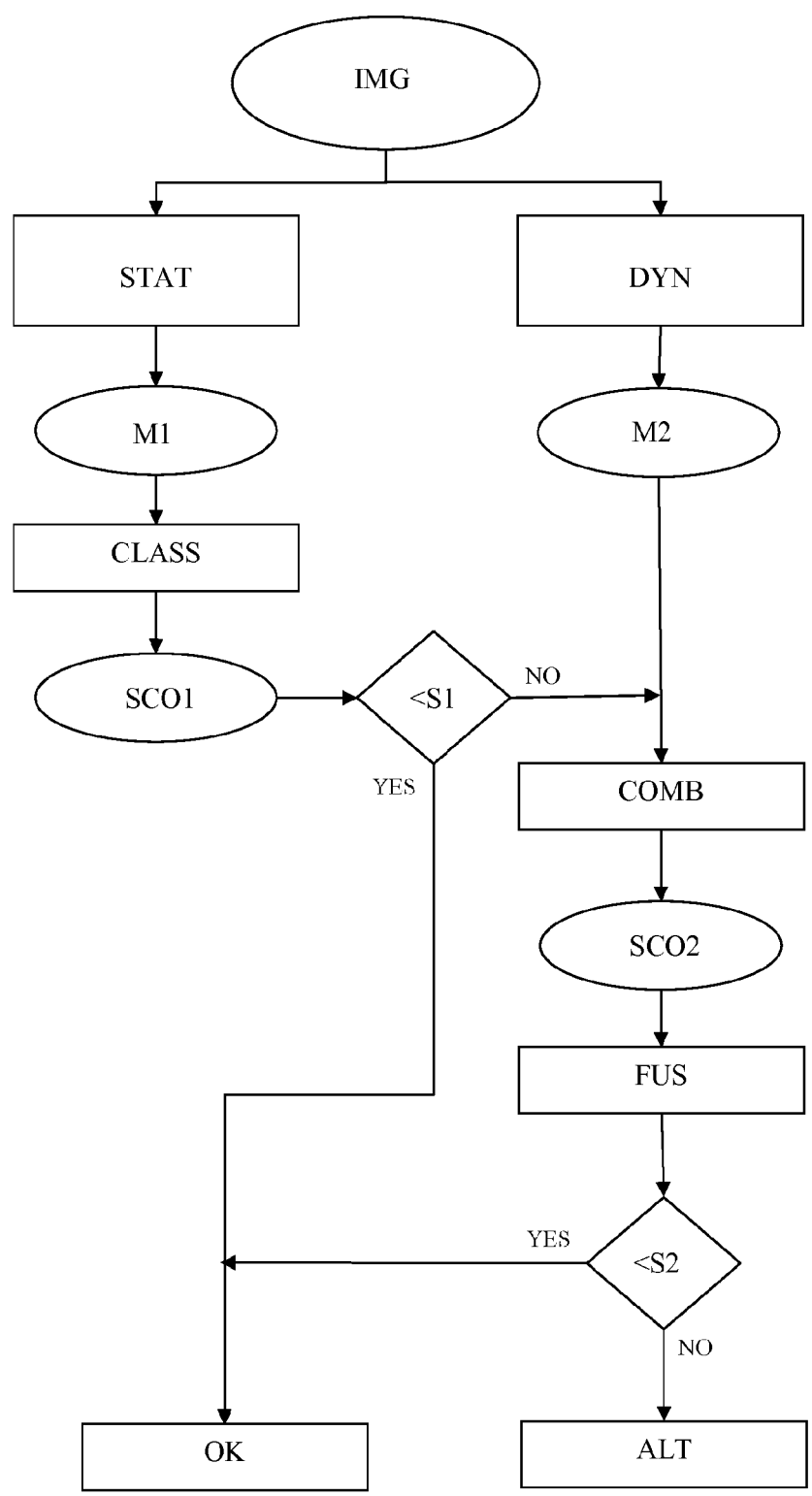

METHOD FOR DETECTING A FAKE FINGER FOR FINGERPRINT ACQUISITION SOFTWARE

CROSS-REFERENCE TO RELATED APPLICATIONS

This application is continuation of U.S. patent application Ser. No. 13/497,525, filed on Mar. 21, 2012, which is a National Stage of International patent application PCT/EP2010/062937, filed on Sep. 3, 2010, which claims priority to foreign French patent application No. FR 09 04515, filed on Sep. 22, 2009, the disclosures of each of which are incorporated by reference in their entireties.

FIELD OF THE DISCLOSED SUBJECT MATTER

The present invention relates to a novel method allowing fingerprint acquisition software to detect possible "fake fingers". By implementing an image analysis procedure unpublished in this field, the method according to the invention allows an improvement in the performance of fingerprint acquisition software.

BACKGROUND

The acquisition and recognition of fingerprints have today become inescapable in the context of the checking of the identity of persons. Current systems for acquiring fingerprints comprise a hardware component and a software component. The hardware component relies essentially on the implementation of a sensor allowing the acquisition of an image of the finger whose print it is sought to acquire. The software component comprises a man-machine interface allowing the acquisition of details, the recording of personal data, the displaying of information intended for the operator and the subject.

Moreover, currently, an aim of fingerprint acquisition software consists increasingly in detecting possible attempted frauds of these systems, through the use of fake fingers, such as molded fingers, latex fingers, etc. These frauds may be motivated by a wish to hide one's identity so as not to be recognized, to usurp somebody's identity, or else to seek to create a fake identity for example. To guarantee the effectiveness of the fingerprint acquisition stations, it is important to develop systems for detecting these attempted frauds.

The invention lies in this context of searching for more effective solutions aimed at detecting fake fingers, by way of a software approach to the problem.

The prior art comprises a certain number of technical solutions making it possible to detect fake fingers. In particular, several technologies based on a hardware approach to the issue have been developed, such as that described in patent U.S. Pat. No. 7,415,139; they usually consist in determining whether the finger for which the image is acquired is indeed alive, by way of measurements of temperatures, blood flow, or by detecting sweating phenomena for example. Other technologies are based on an analysis of the image of the print of the finger; such techniques are for example disclosed in publications such as R. DERAKHSHANI ET AL, "Determination of vitality from a non-invasive biomedical measurement for use in fingerprint scanners", in Pattern Recognition, v 36, n 2, p 383-96, February 2003, or else in S. NIKAM ET AL, "Wavelet energy signature and GLCM features based fingerprint anti-spoofing", for Sixth IIEEE International conference on Wavelet Analysis and Pattern Recognition (ICWAPR-2008), Hong Kong, 30-31 Aug. 2008, to give an example proposing a wavelet analysis of the image acquired.

SUMMARY

An aim of the invention is to propose an alternative and particularly effective technological solution, by dealing with the problem of detecting fake fingers, in the context of fingerprint acquisition software, according to two avenues: the first avenue consists in introducing a novel criterion for analyzing an image of a finger; the second avenue, making it possible to further improve performance within the framework of a preferred embodiment of the invention, resides in the idea of combining a static image analysis and a dynamic analysis of a stream of images so as to remove a maximum of ambiguities within the framework of a method for detecting a fake finger.

For this purpose, the subject of the invention is a method for detecting a fake finger for fingerprint acquisition software comprising a step of acquiring the image of a finger, comprising:
 a step of static analysis of said image of a finger, said static analysis comprising the calculation and the analysis of any one of the Gray Level Run Length matrices, termed GLRL matrices, corresponding to said image of a finger;
 a step of constructing a first characteristic vector of the image of a finger comprising at least partially said GLRL matrix.

According to one mode of implementation of the invention, said static analysis furthermore comprises:
 the analysis of the periodicity of the pores of the skin; and/or:
 the calculation and the analysis of the Gray Level Cooccurrence Matrix, termed GLCM, associated with the image of a finger.

Advantageously, the static analysis step may be followed by the implementation of a principal component analysis procedure, termed a PCA procedure.

Advantageously, the static analysis step may be followed by the implementation of a supervised training procedure with the help of a training database applied to the first characteristic vector.

Advantageously, the static analysis step may moreover be followed by the implementation of a kernels analysis applied to the first characteristic vector of the image of a finger based on said supervised training procedure.

Advantageously, the kernels analysis furthermore comprises a classification step.

Advantageously, the method according to the invention can determine, as a function of the results of the static analysis procedures, a first score corresponding to a confidence index related to the probability that the finger at the origin of the analyzed image is genuine, respectively fake.

Advantageously, the method according to the invention can also comprise a step of alerting the operator in the case where the first score is lower than a first predetermined threshold.

Advantageously, the method according to the invention can moreover comprise a step of acquiring a stream of images of a finger comprising a plurality of images of the finger, as well as a step of dynamic analysis of said stream of images culminating in the construction of a second characteristic vector of the stream of images.

Advantageously, the dynamic analysis step is followed by a linear combination of the measurements constituting the second characteristic vector.

Advantageously, the dynamic analysis step is able to allow the detection of a phenomenon of sweating of the finger.

Advantageously, the dynamic analysis step comprises the implementation of one or more dynamic analysis procedures from among the following procedures:
- an analysis of the temporal evolution over one dimension of the ridge lines of the images of the stream of images of the finger;
- a wavelet analysis of the stream of images of the finger.

Advantageously, the stream of images is stored on a computerized support with a view to a subsequent analysis.

Advantageously, the dynamic analysis step may be followed by the implementation of a second supervised training procedure with the help of a training database applied to the second characteristic vector.

Advantageously, the dynamic analysis step can furthermore be followed by the implementation of a kernels analysis applied to the second characteristic vector based on said supervised training procedure.

Advantageously, the method according to the invention can determine, as a function of the results of the dynamic analysis procedures, a second score corresponding to a confidence index related to the probability that the finger at the origin of the analyzed image is genuine.

Advantageously, the method according to the invention can also comprise a step of alerting the operator in the case where the second score is lower than a second predetermined threshold.

Advantageously, the static analysis step and the dynamic analysis step culminate respectively in the determination of a first score and of a second score, and in that said method comprises a fusion step for merging said first and second scores with a view to determining an improved confidence index related to the probability that the finger at the origin of the analyzed image is genuine.

Advantageously, the method according to the invention can also comprise a step of alerting the operator in the case where the score is lower than a second predetermined threshold.

The invention also resides in a fingerprint acquisition station comprising:
- a sensor allowing the acquisition of the image of one or more fingers;
- a computerized assembly comprising a first display screen of a first man-machine interface intended for the operator of the acquisition station and a computer implementing a piece of software, the software implementing the method described previously.

Advantageously, said fingerprint acquisition station, furthermore comprising a sensor allowing the acquisition of a stream of images of one or more fingers.

Advantageously, said fingerprint acquisition station furthermore comprises a second man-machine interface intended for the subject for whom said acquisition station carries out the acquisition of the image of one or more fingers, said second man-machine interface being able to be displayed on the first display screen or on a second display screen.

BRIEF DESCRIPTION OF THE DRAWINGS

Other characteristics and advantages of the invention will become apparent with the aid of the description which follows, given with regard to the appended drawing which represents:

FIG. 1: the block diagram of the principle of the invention according to its preferred embodiment.

DETAILED DESCRIPTION

FIG. 1 presents a block diagram of the method for detecting fake fingers according to the invention, according to its preferred embodiment, integrating certain optional characteristics.

The method according to the invention is implemented from the instant at which an image IMG of one or more fingers has been acquired by an arbitrary optical sensor. Said method comprises a first step of static analysis STAT of the image IMG of a finger. In an optional manner, the method according to the invention can comprise, in parallel, a step of dynamic analysis DYN of the image IMG. Preferably, the dynamic analysis step DYN is carried out only if the static analysis step STAT makes it possible to determine that it is necessary, or at the least recommended, that this dynamic analysis step DYN be performed so as to improve the quality of the result obtained.

The static analysis step STAT culminates in the construction of a vector characterizing the image IMG of a finger. According to the invention, the static analysis step STAT comprises, for this purpose, a step of calculating a GLRL (Gray Level Run Length) matrix corresponding to the image IMG of a finger. The calculation of a GLRL matrix to perform the analysis of an image is known per se. Thus, the publication F. ALBREGTSEN, "Statistical Texture Measures Computed From Gray Level Run Length Matrices", for Image Processing Laboratory, Department of Informatics, University of Oslo, November 1995, makes reference thereto. In the field of the detection of fake fingers for fingerprint acquisition software, this practice is unknown. The calculation of an arbitrary GLRL matrix associated with the image IMG of a finger makes it possible to have an accurate characterization of the image IMG of a finger with a minimum of information.

With the help of this GLRL matrix, and possibly of other results arising from different static analysis procedures, the method according to the invention provides for the construction of a characteristic vector of the image IMG of a finger with the help of a set of measurements M1 arising from the static analysis step STAT. According to the invention, the static analysis step STAT therefore comprises at least the calculation of a GLRL matrix associated with the image IMG of a finger. The analysis of the GLRL matrix affords notably details on the texture of the skin of the finger.

Preferably, the calculation of said GLRL matrix will be combined with other static analysis procedures such as:
- an analysis of the periodicity of the pores of the skin by the technique, known to the person skilled in the art, of Fourier transforms, so-called FFT (Fast Fourier Transform), applied to the signal of the ridge lines of the print of the finger that are detected on the image IMG;
- an analysis of the roughness by a procedure of wavelet analysis of the signal of the valleys of the print of the finger that are detected on the image IMG;
- an analysis of the texture of the skin of the finger by means this time of the analysis of the Gray Level Cooccurrence Matrix, termed GLCM.

The method according to the invention can comprise, after this static analysis step STAT culminating in the construction of a vector of measurements M1 characteristic of the image IMG of a finger, a step of processing and classification CLASS of these measurements M1 by a statistical approach, such as a principal component analysis procedure, termed a PCA procedure, or a known fuzzy logic technique. This step, in particular in the case where the static analysis step STAT comprises the analysis of various criteria, corresponds preferably to a so-called "kernels" analysis comprising a phase based on a supervised training procedure with the help of a training database, and a classification phase proper.

In any event, the method according to the invention then makes it possible to calculate a first score, or index, SCO1, reflecting a confidence index relating to the probability that the finger for which the image IMG is undergoing analysis is a genuine finger. This score SCO1 is compared with a first predetermined threshold S1. If the first score SCO1 is greater than the first predetermined threshold S1, a margin possibly being provided for, then the confidence index is sufficient and the operator, if any, can be advised thereof.

According to a first embodiment, the method for detecting a fake finger according to the invention has then finished. In an optional manner, it may nonetheless comprise a further dynamic analysis step DYN, such as described hereinbelow, in the guise of verification.

If the first score SCO1 is lower than the first predetermined threshold S1, a margin possibly being provided for, then the confidence index is insufficient and the operator, if any, may be advised of the fact that it is likely that the finger for which the image IMG is undergoing analysis is fake. The operator advice can take the form of an alert message ALT. This advice or this alert ALT can, according to the simplest embodiment, arise without a step of dynamic analysis DYN of the image IMG being implemented, although this is not represented in FIG. 1.

According to the preferred mode of implementation of the method according to the invention, when the first score SCO1 is lower than the predetermined threshold S1, a margin possibly being provided for, said method comprises an additional step of dynamic analysis DYN. However, this dynamic analysis step DYN may be performed systematically, for example in parallel with the static analysis step STAT. The dynamic analysis DYN is based on the evolution over time of a plurality of images IMG acquired over a certain duration. The sensor then acquires a stream of images IMG. Typically, such a sensor can acquire two images IMG spaced two or three seconds apart. This dynamic analysis step DYN can comprise one or a combination of dynamic analysis procedures, from among the following procedures:

- a temporal analysis of the signal on a dimension of the ridge lines of the print of the finger that are detected on the stream of images IMG;
- a wavelet analysis of the stream of images and the calculation of the energy ratio between the initial image, or first image of the stream of images IMG, and the final image, or last image of the stream of images IMG.

The dynamic analysis step DYN culminates in the construction of a vector of measurements M2 characteristic of the stream of images IMG.

In the method according to the invention, the dynamic analysis step DYN may make it possible to calculate at this moment a second score, or index, SCO2, reflecting a confidence index relating to the probability that the finger for which the image IMG is undergoing analysis is a genuine finger. In FIG. 1, and in accordance with a preferred mode of implementation of the invention, the second score SCO2 is calculated after a step of linear combination COMB of the measurements of the vector M2 has been performed. To improve the determination of the second score SCO2, this step COMB may be followed by a training phase with the help of a training database. Also, as in the case of the static analysis step STAT, a processing of the vector of measurements M2 may be carried out with the aid of a "kernels" analysis based on said training procedure.

Once determined, the second score SCO2 is compared with a second predetermined threshold S2. If the second score SCO2 is greater than the second predetermined threshold S2, a margin possibly being provided for, then the confidence index is sufficient and the operator, if any, can be advised thereof.

In the converse case, that is to say if the second score SCO2 is lower than the second predetermined threshold S2, a margin possibly being provided for, then the confidence index is insufficient and the operator, if any, may be advised of the fact that it is likely that the finger for which the image IMG and a stream of images IMG are undergoing analysis is fake. The operator advice can take the form of an alert message ALT.

According to the preferred mode of implementation of the method according to the invention, in which the dynamic analysis step DYN is performed only if the first score SCO1 is lower than the first predetermined threshold S1, a fusion FUS of the first SCO1 and second scores SCO2 is carried out before comparing the result with the second threshold S2.

It is then the result of the fusion FUS which is compared with the second predetermined threshold S2. If fusion FUS of the first SCO1 and second scores SCO2 is greater than the second predetermined threshold S2, a margin possibly being provided for, then the confidence index is sufficient and the operator, if any, can be advised thereof.

In the converse case, that is to say if fusion FUS of the first SCO1 and second scores SCO2 is lower than the second predetermined threshold S2, a margin possibly being provided for, then the confidence index is insufficient and the operator, if any, may be advised of the fact that it is likely that the finger for which the image IMG and a stream of images IMG are undergoing analysis is fake. The operator advice can take the form of an alert message ALT.

Moreover, in a particular embodiment of the invention, the stream of images IMG may be stored on a computerized support with a view to a subsequent analysis, so as not to slow the overall process of acquiring fingerprints.

It should be noted that the present invention also covers a fingerprint acquisition station able to implement the method described hereinabove. Such an acquisition station comprises a sensor configured to carry out the acquisition of the image of one or more fingers and, optionally, the acquisition of a stream of images of one or more fingers. The acquisition station according to the invention furthermore comprises a computerized assembly endowed with a piece of software implementing the method according to the invention. Furthermore, said acquisition station can comprise a first screen exhibiting a man-machine interface intended for the operator of the station for the purposes of displaying information or entering details.

The station can also comprise a second screen exhibiting a man-machine interface intended for the subject, one or more of whose fingers are undergoing acquisition, essentially for information display purposes.

To summarize, the principal advantage of the invention is to propose a method for detecting a fake finger for fingerprint acquisition software with the improved performance. To this end, the method according to the invention claims the implementation of a static analysis step comprising the calculation of a GLRL matrix of an image of a finger.

Optionally, but preferably, the invention furthermore proposes the combining of a static analysis and a dynamic analysis so as to optimize the ability to detect fake fingers.

The invention claimed is:

1. A method for detecting a fake finger for fingerprint acquisition software comprising:
   using a processor to perform the steps of:
      acquiring an image of a finger;
      static analysis of said image, said static analysis comprising calculation and analysis of any one of a Gray Level Run Length (GLRL) matrices corresponding to said image;
      constructing a first characteristic vector of the image comprising at least partially said GLRL matrix; and determining, as a function of results of the static analysis, a first score corresponding to a confidence index related to a probability that a finger at an origin of the analyzed image is genuine or fake.

2. The method according to claim 1, wherein said static analysis furthermore comprises at least one of: analysis of the periodicity of pores of the skin; and calculation and analysis of a Gray Level Cooccurrence Matrix (GLCM) associated with the image.

3. The method according to claim 1, wherein the static analysis is followed by implementation of a principal component analysis (PCA) procedure.

4. The method according to claim 1, wherein the static analysis is followed by implementation of a supervised training procedure with help of a training database applied to the first characteristic vector.

5. The method according to claim 4, wherein the static analysis is followed by implementation of a kernels analysis applied to the first characteristic vector of the image based on said supervised training procedure.

6. The method according to claim 5, wherein the kernels analysis furthermore comprises a classification step.

7. The method according to claim 1 , further comprising alerting an operator in response to the first score being lower than a first predetermined threshold.

8. The method according to claim 1, further comprising acquiring a stream of images of a finger comprising a plurality of images of the finger; and dynamic analysis of said stream of images resulting in construction of a second characteristic vector of the stream of images.

9. The method according to claim 8, wherein the dynamic analysis is followed by a linear combination of measurements in the second characteristic vector.

10. The method according to claim 8, wherein the dynamic analysis is able to detect a phenomenon of sweating of the finger.

11. The method according to claim 8, wherein the dynamic analysis comprises implementation of one or more dynamic analysis procedures included in the following procedures: an analysis of temporal evolution over one dimension of ridge lines of the images of the stream of images; and a wavelet analysis of the stream of images.

12. The method according to claim 8, wherein the stream of images is stored on a computerized support allowing for subsequent analysis.

13. The method according to claim 8, wherein the dynamic analysis is followed by implementation of a second supervised training procedure with help of a training database applied to the second characteristic vector.

14. The method according to claim 13, wherein the dynamic analysis is followed by implementation of a kernels analysis applied to the second characteristic vector based on said supervised training procedure.

15. The method according to claim 8, further comprising determining, as a function of results of the dynamic analysis procedures, a second score corresponding to a confidence index related to the a probability that a finger at an origin of the image is genuine.

16. The method according to claim 15, further comprising alerting an operator when the second score is lower than a second predetermined threshold.

17. The method according to claim 8, wherein the static analysis and the dynamic analysis culminate respectively in the determination of a first score and of a second score, and said method further comprises merging said first and second scores to determine an improved confidence index related to a probability that a finger at an origin of the image is genuine.

18. The method according to claim 17, further comprising alerting an operator in response to the second score is being lower than a second predetermined threshold.

19. A fingerprint acquisition station comprising:
 a first sensor allowing acquisition of an image of one or more fingers;
 a second sensor allowing the acquisition of a stream of images of one or more fingers; and
 a computerized assembly comprising a first display screen of a first man-machine interface intended for an operator of the acquisition station and a computer implementing a piece of software,
 wherein the software comprises first code instructions for acquiring an image-of a finger; static analysis of said image, said static analysis comprising calculation and analysis of any one of a Gray Level Run Length (GLRL) matrices corresponding to said image; constructing a first characteristic vector of the image comprising at least partially said GLRL matrix; and determining, as a function of results of the static analysis, a first score corresponding to a confidence index related to a probability that a finger at an origin of the analyzed image is genuine or fake; and
 second code instructions for alerting an operator in response to the first score being lower than a first predetermined threshold.

20. The acquisition station according to claim 19, further comprising a second man-machine interface intended for a subject for whom said acquisition station carries out the acquisition of the image of one or more fingers, said second man-machine interface being able to be displayed on the first display screen or on a second display screen.

21. The acquisition station according to claim 19, wherein said static analysis furthermore comprises at least one of: analysis of the periodicity of pores of the skin; and calculation and analysis of a Gray Level Cooccurrence Matrix (GLCM) associated with the image.

\* \* \* \* \*